UNITED STATES PATENT OFFICE.

SAMUEL S. SADTLER, OF SPRINGFIELD TOWNSHIP, MONTGOMERY COUNTY, PENNSYLVANIA.

PROCESS OF MAKING HYDROGEN CONTAINING ALKALI-METAL PHOSPHATES AND A SALT PRODUCED THEREIN.

1,357,120.   Specification of Letters Patent.   Patented Oct. 26, 1920.

No Drawing. Application filed January 30, 1919, Serial No. 274,122. Renewed September 10, 1920. Serial No. 409,488.

*To all whom it may concern:*

Be it known that I, SAMUEL S. SADTLER, a citizen of the United States, residing at Springfield township, in the county of Montgomery and State of Pennsylvania, have invented certain new and useful Improvements in Processes of Making Hydrogen Containing Alkali-Metal Phosphates and a Salt Produced Therein, of which the following is a specification.

This invention relates to a process of making hydrogen containing alkali-metal phosphates, and in its preferred embodiment consists in a process of producing potassium ammonium hydrogen phosphate either as a pure salt or as a salt having only the degree of purity required for use as a concentrated fertilizer or as an ingredient of fertilizer.

Owing to the high cost of transporting mixed fertilizers it is very desirable to produce a combination of fertilizer ingredients relatively free from other constituents than potassium, ammonium and phosphoric acid.

I have discovered that hydrogen containing alkali-metal phosphates can be readily and cheaply produced by the treatment of tricalcium phosphate either substantially pure or as it exists in phosphate rock, (phosphorite), bone phosphate or the like, and that a highly concentrated and efficient fertilizer material can be produced in the form of a compound containing potassium ammonium and phosphoric acid in the compound potassium ammonium hydrogen phosphate, $K(NH_4)HPO_4$, which as far as I am aware, has not been heretofore made.

In the practice of my process, I treat tricalcium phosphate, preferably making use of ground phosphorite, with a mineral acid, preferably sulfuric or sulfurous acid although hydrochloric acid may be employed, using however, less acid than is employed in making the ordinary superphosphate in which last mentioned process the principal reaction is represented by the following equation:

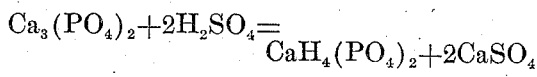

$Ca_3(PO_4)_2 + 2H_2SO_4 = CaH_4(PO_4)_2 + 2CaSO_4$

In treating the tricalcium phosphate with the acids referred to in accordance with the present invention, the reactions which occur are indicated by the following equations:

(A). $Ca_3(PO_4)_2 + H_2SO_4 =$
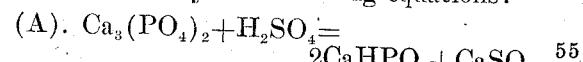
$2CaHPO_4 + CaSO_4$.

(B). $Ca_3(PO_4)_2 + SO_2 + H_2O =$
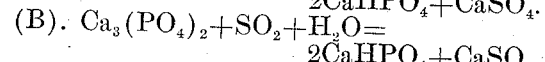
$2CaHPO_4 + CaSO_3$.

(C). $Ca_3(PO_4)_2 + 2HCl =$
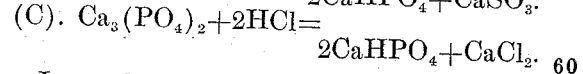
$2CaHPO_4 + CaCl_2$.

In each case water insoluble calcium monohydrogen phosphate having the formula $CaPHO_4$ is produced. In the cases of equations A and B, the by-products are insoluble in water while in equation C the by-product is soluble. These by-products have an influence upon the efficiency of the process and if such by-products are left with the calcium monohydrogen phosphate during the subsequent treatment, they will have an influence at later stages but not such influence as to interfere with the practice of my process or the operation of the principles involved therein. As far as the principle of my process is concerned, these by-products may be ignored.

In making use of calcium monohydrogen phosphate in the production of potassium ammonium hydrogen phosphate I may proceed by either of two alternative steps. I may either treat the calcium monohydrogen phosphate with potassium sulfate and ammonium sulfate simultaneously in a single operation or I may carry out such treatments separately. The reactions whether carried out together or separately are represented by the following equations:

$CaHPO_4 + K_2SO_4 = K_2HPO_4 + CaSO_4$ and

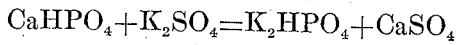
$CaHPO_4 + (NH_4)_2SO_4 =$
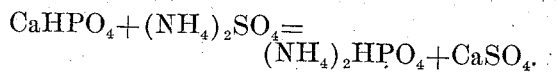
$(NH_4)_2HPO_4 + CaSO_4$.

If these reactions are separately carried out there are separately produced and in a manner believed to be hitherto unknown, two hydrogen containing alkali-metal phosphates, each of which is adapted for use as a fertilizer or as an ingredient of fertilizers.

In the production of potassium ammonium hydrogen phosphate, the two hydrogen containing alkali-metal phosphates produced in the second stage of my process are caused to react upon each other whereby potassium ammonium hydrogen phosphate is produced. If the salts are produced simultaneously in a single operation, this compound is formed in such operation. In either case the two hydrogen containing alkali-metal phosphates react to produce potassium ammonium hydrogen phosphate according to the following equation:

$$K_2HPO_4 + (NH_4)_2HPO_4 = 2K(NH_4)HPO_4.$$

In each of the two alternative steps of the second stage of my process, in place of the potassium sulfate I may use any potassium salt of an acid adapted to form an insoluble or nearly insoluble salt with calcium, such for example as potassium sulfite, potassium citrate or potassium tartrate and instead of using ammonium sulfate, I may employ any ammonium salt of an acid adapted to form an insoluble or nearly insoluble compound with calcium, such for example as ammonium sulfite, ammonium citrate or ammonium tartrate.

In the practice of my process as hereinbefore described, I may advantageously proceed as follows:

One kilogram of finely ground phosphorite is treated with one liter of dilute sulfuric acid containing approximately 272 grams of actual $H_2SO_4$. The mass is stirred and as the reaction proceeds, becomes heated to a considerable extent. The mass is allowed to stand until the reaction is completed and the resulting mass is then divided into two equal parts.

A. To one half I add approximately 167 grams of potassium sulfate and about 300 cubic centimeters of water, agitating the resulting mass while applying heat thereto. The consistency of the mass is at first creamy but after it is heated to its boiling point it stiffens up. The heating is then discontinued and the mass allowed to cool.

The mass is then lixiviated with water and the resulting liquor filtered and mixed with the liquor obtained in the procedure described in paragraph B.

These steps of the process can be carried out at ordinary atmospheric pressure, but I have found it advantageous in some cases to carry out the digestion under superatmospheric pressure, preferably at a temperature of from about 120° to 140° C.

B. To the other half of the rock and acid mixture, I add about 127 grams of ammonium sulfate and about 300 cubic centimeters of water and proceed in the same manner as in treatment A. The reaction is, however, slower so that, while I may conduct the operation at atmospheric pressure, it is even more advantageous in this case to digest the materials under super-atmospheric pressure and I prefer to digest the materials at a temperature of from about 120° to 140° C. The mass is then lixiviated with water and the resulting liquor filtered and mixed with the potassium salt solution produced by procedure A and the combined liquor concentrated and crystallized.

The resulting salt is water soluble and contains in highly concentrated form and in admirable proportions for general use, important fertilizer elements of well recognized value and efficiency. If desired, the salt may be purified to any desired extent as by repeated recrystallization.

The amount of water which I may employ in my process is not of particular importance and may be variable within considerable limits.

The amount of rock specified in the example given herein is theoretically in excess of that required but after being used the first time it may be used again with new batches as is well understood in connection with series extraction.

I have also found that I am able to produce sodium ammonium hydrogen phosphate in accordance with the principles of my process. In this case, I proceed as indicated, using, however, sodium sulfate in place of potassium sulfate in the second stage of the process and producing sodium hydrogen phosphate according to the following equation:

$$CaHPO_4 + Na_2SO_4 = Na_2HPO_4 + CaSO_4.$$

This sodium salt is combined with the ammonium hydrogen phosphate produced as described, according to the following equation:

$$Na_2HPO_4 + (NH_4)_2HPO_4 = 2NaNH_4HPO_4.4H_2O$$

In this modification of my process instead of sodium sulfate, I may use any sodium salt of an acid adapted to form an insoluble or nearly insoluble salt with calcium, such for example as sodium sulfite, sodium citrate or sodium tartrate.

I have found that some measure of practical success can be obtained by carrying out the first and second stages of my process simultaneously, the potassium ammonium hydrogen phosphate being produced in a single operation. In this case the tricalcium phosphate, mineral acid, potassium salt, ammonium salt and water are heated, preferably under pressure, at a temperature of approximately from 120° to 140° C., the details and procedure of the process as described being thereafter followed.

While I prefer in the second stage of my process to employ calcium monohydrogen phosphate, some measure of success can be obtained by the use of any mixture of phosphoric acid, monocalcium phosphate, dicalcium phosphate, and unchanged tri-calcium phosphate which is equivalent to calcium monohydrogen phosphate in basicity and the use of such mixture instead of calcium monohydrogen phosphate is contemplated in my invention.

While I have described in detail the preferred practice of my process, it is to be understood that the details of procedure, proportions of ingredients, temperature conditions and the like may be materially varied and that known chemical equivalents of the materials employed may be used, all without departure from the spirit of my invention or the scope of the subjoined claims.

Having thus described my invention, I claim:

1. The herein described process which comprises reacting upon calcium monohydrogen phosphate with an alkali-metal salt of an acid adapted to form an approximately insoluble salt with calcium.

2. The herein described process which comprises heating together in the presence of water, calcium monohydrogen phosphate and an alkali-metal salt of an acid adapted to form an approximately insoluble salt with calcium.

3. The herein described process which comprises acting upon calcium monohydrogen phosphate with an alkali-metal salt of an acid adapted to form an approximately insoluble salt with calcium, the reaction being conducted under superatmospheric pressure.

4. The herein described process which comprises reacting upon calcium monohydrogen phosphate with ammonium sulfate.

5. The herein described process which comprises reacting upon calcium monohydrogen phosphate with an ammonium salt of an acid adapted to form a relatively insoluble salt with calcium.

6. The herein described process which comprises reacting upon calcium monohydrogen phosphate with a plurality of different alkali-metal salts, the acid constituent of each of which is adapted to form an approximately insoluble salt with calcium.

7. The herein described process which comprises heating together in the presence of water, calcium monohydrogen phosphate and a plurality of different alkali-metal salts, the acid constituent of each of which is adapted to form an approximately insoluble salt with calcium.

8. The herein described process which comprises reacting upon calcium monohydrogen phosphate with a plurality of different alkali-metal salts, the acid constituent of each of which is adapted to form an approximately insoluble salt with calcium, the reaction being conducted under superatmospheric pressure.

9. The herein described process which comprises reacting upon calcium monohydrogen phosphate with potassium and ammonium salts, the acid constituent of each of which is adapted to form an approximately insoluble salt with calcium.

10. The herein described process which comprises reacting upon calcium monohydrogen phosphate with potassium sulfate and ammonium sulfate.

11. The herein described process which consists in separately reacting upon calcium monohydrogen phosphate with a plurality of different alkali-metal salts, the acid constituent of each of which is adapted to form an approximately insoluble salt with calcium and causing the resulting alkali salts of phosphoric acid to react upon each other, whereby a double alkali-metal hydrogen phosphate is produced.

12. The herein described process which consists in separately reacting upon calcium monohydrogen phosphate with a potassium salt and an ammonium salt, the acid constituent of each of which is adapted to form an approximately insoluble salt with calcium and causing the resulting potassium and ammonium salts to react upon each other whereby potassium ammonium hydrogen phosphate is produced.

13. The herein described process which consists in separately reacting upon calcium monohydrogen phosphate with potassium sulfate and ammonium sulfate and causing the resulting potassium monohydrogen phosphate and ammonium hydrogen phosphate to react upon each other whereby potassium ammonium hydrogen phosphate is produced.

14. The herein described product comprising water soluble potassium ammonium hydrogen phosphate having the formula $K(NH_4)HPO_4$.

15. The herein described process of heating together in the presence of water, calcium tri-phosphate and the proper proportion of an acid to form calcium mono-hydrogen phosphate, and a plurality of alkali-metal salts, the acid constituents of which are adapted to form an approximately insoluble salt with calcium.

In testimony whereof I affix my signature in presence of two witnesses.

SAMUEL S. SADTLER.

Witnesses:
GERTRUDE M. SUPPLEE,
HARRY P. BASSETT.